United States Patent [19]

Netravali et al.

[11] Patent Number: 4,611,347
[45] Date of Patent: Sep. 9, 1986

[54] VIDEO RECOGNITION SYSTEM

[75] Inventors: Arun N. Netravali, Westfield; Jakub Segen, Fair Haven, both of N.J.

[73] Assignee: AT&T Bell Laboratories, Murray Hill, N.J.

[21] Appl. No.: 653,213

[22] Filed: Sep. 24, 1984

[51] Int. Cl.[4] ............................................. G06K 9/62
[52] U.S. Cl. ........................................ 382/27; 382/34; 382/38
[58] Field of Search .................... 382/38, 37, 34, 30, 382/27

[56] References Cited

U.S. PATENT DOCUMENTS

| | | | |
|---|---|---|---|
| 3,764,980 | 10/1973 | Dansac et al. | 382/38 |
| 3,930,231 | 12/1975 | Henrichon et al. | 382/27 |
| 3,947,833 | 3/1976 | Eckstein | 382/37 |
| 4,030,068 | 6/1977 | Banz | 382/38 |
| 4,288,782 | 9/1981 | Bader et al. | 382/34 |
| 4,385,322 | 5/1983 | Hubach et al. | 358/221 |

OTHER PUBLICATIONS

Ernest L. Hall, Computer Image Processing and Recognition, 1981, pp. 368–412, 468–484.
*Proc. of 5th Internat. Conf. on Pattern Recognition,* Miami Beach, Dec. 1980, pp. 645–659, "A Nonparametric Multiclass Partitioning Method for Classification", D. E. Gustafson and S. Gelfand.
"Computer Vision", Prentice-Hall, Englewood Cliffs, 1982, D. H Ballard and C. M. Brown.
*Proc. of SPIE,* Virginia, May 6–7, 1982, pp. 12–19, "Pattern Recognition for Automatic Visual Inspection", K. S. Fu.
*Proc. of PRIP,* Chicago, May 31–Jun. 2, 1978, pp. 280–286, "A Comparison of Some Image Searching Methods", S. L. Tanimoto.
*Proc. of PRIP,* Chicago, Aug. 1979, pp. 38–43, "A Combined Nonparametric Approach to Feature Selection and Binary Decision Tree Design", E. M. Rounds
*Proc. Internat. Conf. on Cybernetics and Society,* Oct. 8–10, 1980, pp. 930–934, "On Mixed Approaches to Pattern Recognition", K. S. Fu.

*Primary Examiner*—Leo H. Boudreau
*Attorney, Agent, or Firm*—John A. Caccuro

[57] ABSTRACT

An image recognition system uses feature or attribute matching for fast coarse selection of a group of reference images which closely resemble an unknown image and thereafter selects the best reference image match from that group using 2-dimensional intensity correlation or template matching. The system provides highly accurate image recognition without resorting to time consuming exhaustive search by template matching.

11 Claims, 9 Drawing Figures

REGION ISOLATOR

FEATURE ANALYZER

ICONIC MATCHER

FIG. 8

| | |
|---|---|
| 801 — FRAME ADDRESS | FEATURE 1 - GLOBAL<br>FEATURE 2 - LOCAL |
| FRAME ADDRESS<br>．<br>．<br>． | FEATURE 3 - GLOBAL<br>FEATURE 4 - GLOBAL<br>．<br>．<br>． |

FIG. 9

$$901 \begin{cases} R(IJ) = \dfrac{\overline{I \cdot J} - \overline{I} \cdot \overline{J}}{\sqrt{\overline{I^2} - (\overline{I})^2} \cdot \sqrt{\overline{J^2} - (\overline{J})^2}} \\ \text{WHERE} \quad \overline{I} = \dfrac{1}{n} \sum_{x,y} I(x,y) \\ \qquad \overline{J} = \dfrac{1}{n} \sum_{x,y} J(x,y) \\ \qquad \overline{I^2} = \dfrac{1}{n} \sum_{x,y} I^2(x,y) \\ \qquad \overline{J^2} = \dfrac{1}{n} \sum_{x,y} J^2(x,y) \\ \qquad \overline{I \cdot J} = \dfrac{1}{n} \sum_{x,y} I(x,y) \cdot J(x,y) \\ \qquad n = \text{TOTAL NUMBER OF ELEMENTS } (x,y) \end{cases}$$

$$902 \begin{cases} R(IJ) = \dfrac{n \cdot \Sigma I(x,y) \cdot J(x,y) - \Sigma I(x,y) \cdot \Sigma J(x,y)}{\sqrt{n \Sigma I^2(x,y) - (\Sigma I(x,y))^2} \sqrt{n \Sigma J^2(x,y) - (\Sigma J(x,y))^2}} \end{cases}$$

VIDEO RECOGNITION SYSTEM

TECHNICAL FIELD

This invention relates to object recognition system and, more particularly, to an apparatus and a method for screening an image for reference patterns and selecting the reference pattern which most closely matches the image.

BACKGROUND OF THE INVENTION

Object or pattern recognition is finding wide applications in industry. The two main techniques utilized for object classification or recognition are template matching and recognition by features. In template matching, the objective is to find the best embedding of a template subimage in an observed image, over transformations such as translation. In practice, one approach is to store a dense set of possible views (or other image descriptors) so that any sensed image is "sufficiently close" to one member of the dense set of views. This approach has at least two problems for many real applications. First, cardinality of the set of views becomes too large for storage and efficient retrieval. Secondly, template matching (particularly matching of an entire image) is very time consuming for a large template library unless it is done in special purpose hardware.

Recognition by features, on the other hand, may have less accuracy of recognition, especially if simple features are used. Accuracy can be improved by including a larger set of sophisticated features, but this increases complexity. What is desired is an object recognition system which is fast and accurate.

SUMMARY OF THE INVENTION

According to the present invention, simple features are extracted from an image first and then based on these features, a subset of reference images stored in memory are retrieved and the closest stored image is selected as the match.

More particularly, the video image (or any two dimensional data) is segmented into two or more regions, the curvature and orientation attributes of selected local features of each region are determined and screened against the respective attributes of reference patterns stored in an attribute memory and the reference patterns are identified and retrieved from memory. For each of the reference patterns, a horizontal and a vertical offset is computed by matching each of the selected local features against each of the reference features. The closest reference pattern for each region of the video image is determined by aligning each region against the reference patterns using the offsets and matching the intensity thereof. Thus, the present invention selects a group of reference images using feature attribute matching for fast coarse searching and selects the best reference image from that group using intensity or template matching for fine matching. This approach keeps the accuracy of recognition high without resorting to the time consuming exhaustive search by template matching. The disclosed image recognition system can also be used as a content based retrieval system.

BRIEF DESCRIPTION OF THE DRAWING

The detailed description of the invention will be more fully appreciated from the illustrative embodiment shown in the drawing, in which:

FIG. 8 shows the attribute memory used by the present invention, and

FIG. 9 shows normal correlation expressions which may be used by the iconic matcher.

DETAILED DESCRIPTION

Figure 1:
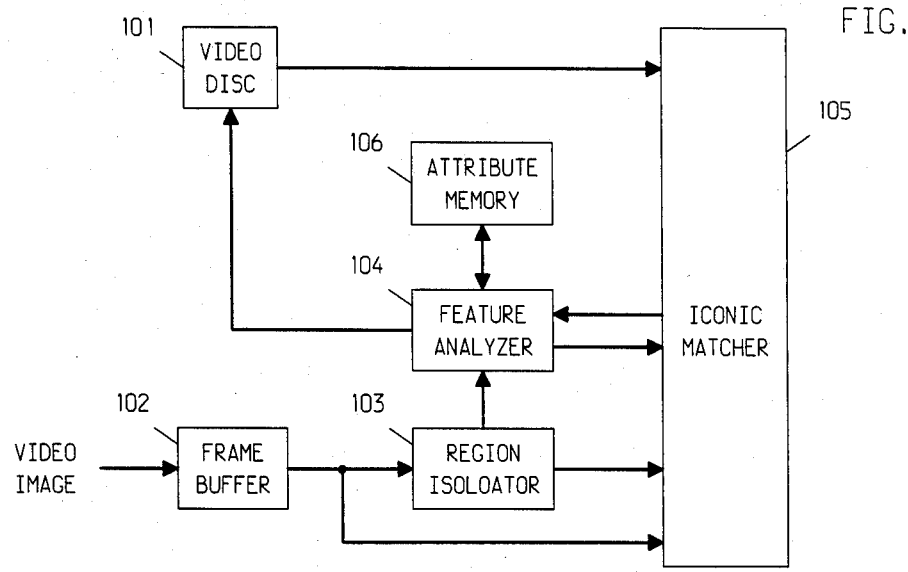
FIG. 1 is a functional block diagram of an object recognition system utilizing the present invention.

Shown in FIG. 1 is a function block diagram or architecture of the present invention. Generally, the present object recognition system includes a training mode and a recognition mode. At the beginning of the training mode, video disc 101 contains images of objects to be identified during the recognition mode. Each disc frame stores one view of an object (template). There is additional information associated with each frame, or its disc address, which may contain object identification, position, orientation, view angle and distance with respect to the camera. This information may be encoded in the frame, or stored in a separate memory. One object may be stored in many views representing varying orientations and distances. The range of orientations, and distances as well as their resolution depend on the application requirements (e.g., if a given piece part to be recognized is always presented in a specific orientation ±20 degrees, then only this range of angles would be stored). All the views of one object are stored in successive frames of the disc to make the selection process easier.

During the recognition mode an image received from an input device (e.g., camera) is stored in the frame buffer 102, then parts of that image that may represent objects, or regions, are extracted by a region isolator 103 and sent to a feature analyzer 104. Feature analyzer 104 computes a set of global and local features for each region and based on those features selects several reference patterns from an associated attribute memory 106, whose features most closely match those of the region. The region is then compared against the selected reference patterns by iconic matcher 105 using two-dimensional correlation, or template matching, to establish a degree of correspondence to each of the reference patterns. This architecture combines the two main approaches to object recognition: recognition by features and template matching. The present invention uses feature based recognition to quickly select all the reference patterns which coursely resemble the image and then uses the slower template matching technique to accurately select which of the selected reference images most closely matches the image.

Figure 2:
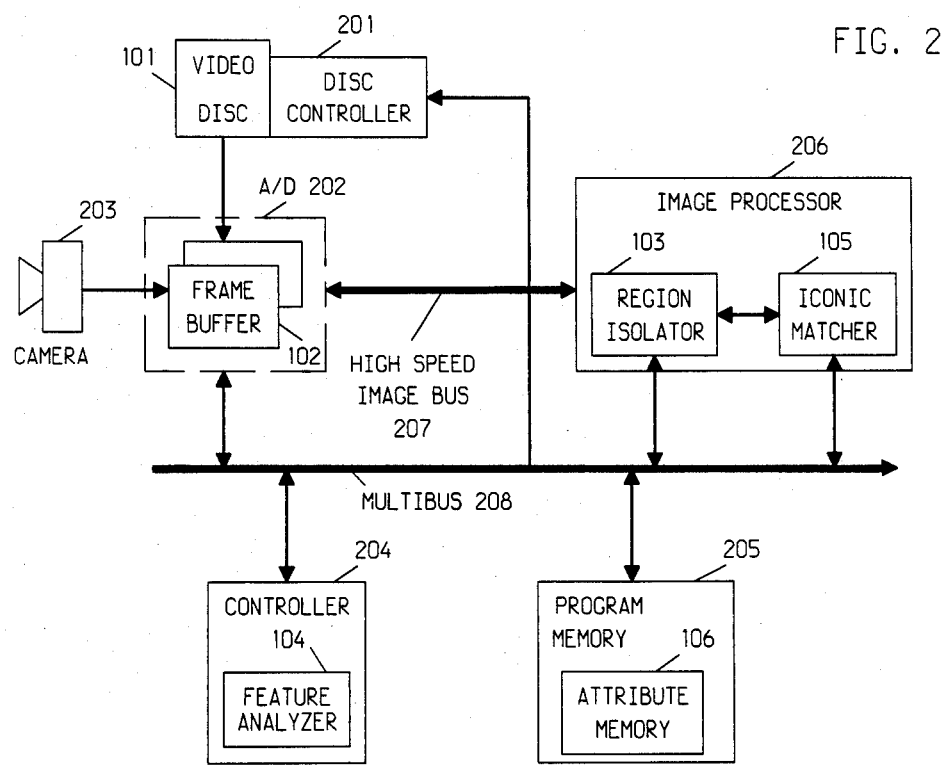
FIG. 2 is a hardware implementation of the object recognition system.

FIG. 2 illustrates one hardware implementation of an object recognition system in accordance with the present invention. It comprises a video disc 101 and disc controller unit 201, camera 203, a frame buffer 102 with image analog to digital A/D converter, or digitizer, 202, Motorola MC 68000 processor 204 is used as the system controller with program memory 205 including attribute memory 106, and a high speed image processor 206. The image digitizer, frame buffer and image processor are connected by a high speed bus 207 for communicating digitized images and they are connected with system controller 204 via Multibus 208. While the disclosed embodiment utilizes a video disc, obviously other types of large capacity memories can be utilized. It should be noted that the object recognition time of the system is highly dependent on the access time of the disc or other memory utilized.

Frame buffer 203 can store 1 frame of 521×512 or 4 frames of 256×256 8 bits pixels (picture elements) and it has built in pan and scroll operations (horizontal and vertical shifts).

Image processor 206 to implement the algorithm of FIG. 9 may include a fast ALU (Arithmetic Logic Unit), 5 adders, 3 multipliers, a static memory for storing two images, all controlled by a programmable sequencer. Segmentation, matching and the calculation of global features is done in image processor 204, while analysis of features, initial template selection and the system control is implemented in processor 206. Thus, image processor performs the region isolator 103 and iconic matcher 104 functions shown in FIG. 1, while processor 204 performs the feature analyzer 104 function shown in FIG. 1.

All the hardware elements of this system except for the image processor are available as commercial products. The attribute memory 106 and feature analyzer 104 may be implemented using a Motorola 68000 based processing system which is available from SUN Microsystems, Inc., Sunnyvale, Calif. Frame buffer 102, which includes a video digitizer, is available from Imaging Technology Inc., Woburn, Mass. Both of these arrangements can communicate with each other over a Multibus (TM) bus (i.e., 206).

Note, in the following descriptions, the first integer of a referenced item denotes the drawing figure in which the referenced item is illustrated (e.g., 801 is found in FIG. 8).

Figure 3:
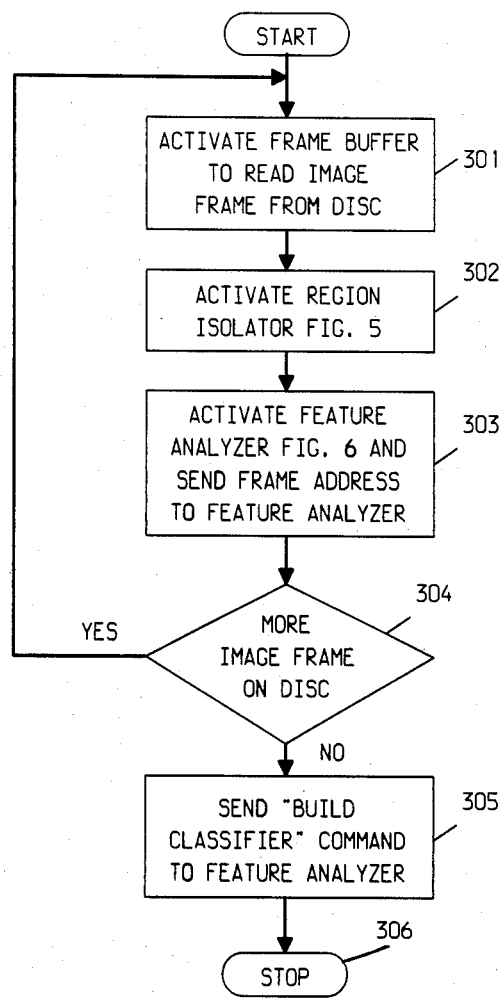
FIG. 3 shows a flow chart which describes the system controller training mode operating sequence.
Figure 6:
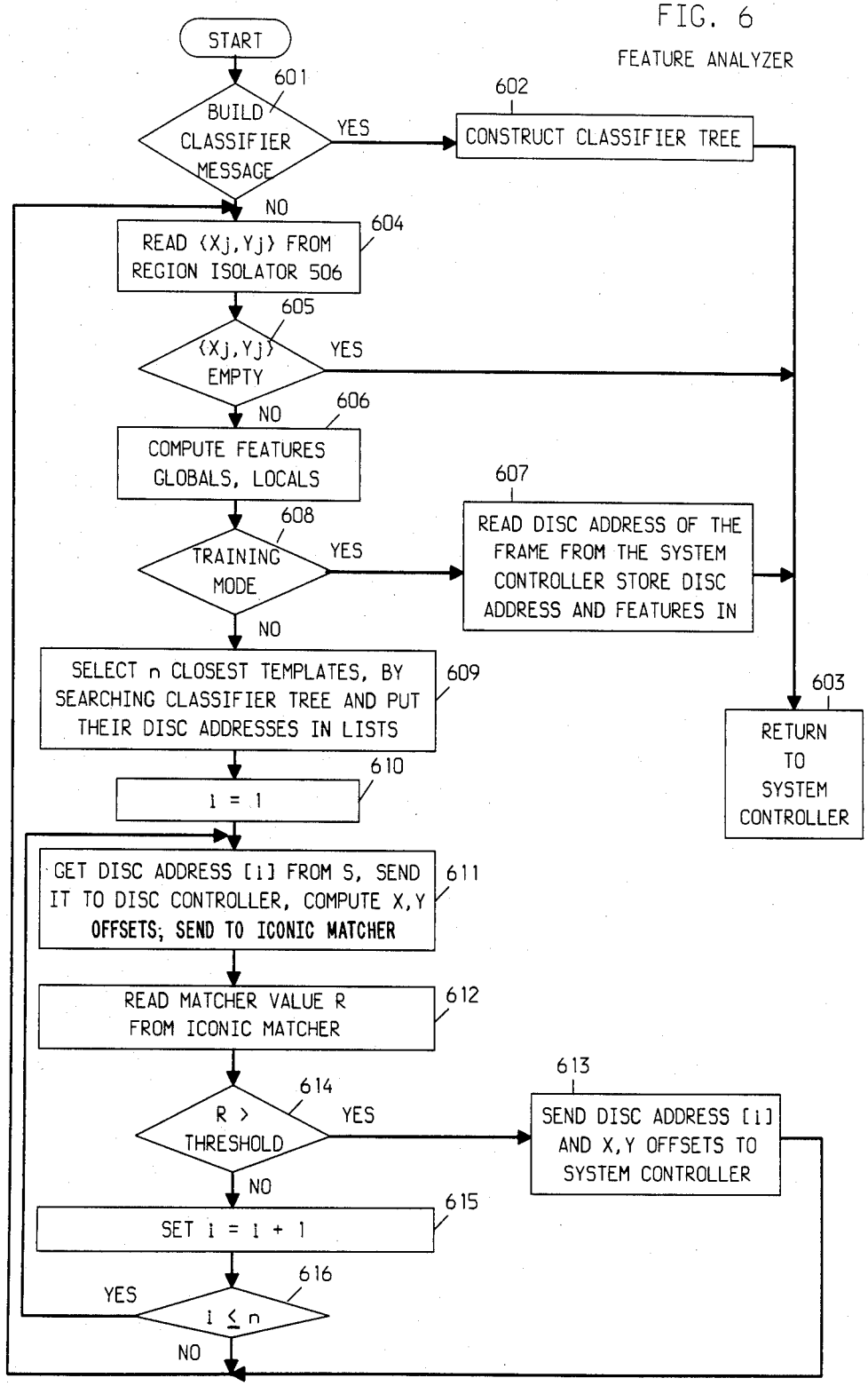
FIG. 6 shows a flow chart which describes the operation of the feature analyzer.

With reference to FIGS. 1, 3 and 6, the training mode of the system is described. The training mode is typically entered when a new disc is placed in service. The disc contains many views or patterns representing varying orientations and distance of the objects to be recognized by the system.

In step 301 a reference frame of the disc is read into frame buffer 102. The region isolator 103 is activated 302 and extracts the template (the part of the frame containing the object) from the frame. Note, during the training mode there is only one template or pattern on each image reference frame of the disc. The detailed operation of region isolator 103 will be described in FIG. 5. Region isolator 103 presents the information extracted from this template to the feature analyzer 303. Feature analyzer also receives the disc address of this frame 303.

Feature analyzer 104 computes the global and local features or attributes for the template or pattern and stores them in a list in attribute memory 106 as shown in 801 of FIG. 8, along with the address of the disc frame containing the template. The detailed operation of feature analyzer 104 will be described in FIG. 6. In step 304, if there are more image reference frames on the disc 101 they are also processed as shown in steps 301, 302 and 303. After the last image reference frame is completed a "build classifier" command is sent to feature analyzer 104 and the operation is completed 306. In response thereto feature analyzer 104, as will be discussed in FIG. 6, constructs a classification tree using the attribute data, to enable a fast logic access to frames containing similar patterns during the recognition mode. This classification tree includes address information associated with the attribute data for locating matching images on frames on the disc using the attribute data.

With reference to FIGS. 1, 2, 4 and 6 the recognition mode of the system is described. In the recognition mode an image from the camera or similar device is read, during step 401, into frame buffer 102. In step 402 the region isolator is activated and the image is segmented into regions, each region contains a prominent object which is to be analyzed by the feature analyzer 104. In step 403 the feature analyzer 104 and iconic matcher 105 are activated. In step 404, the list of recognized objects is set to "empty". An element of this list corresponds to a recognized object. It contains disc address of a frame containing the matching template, and X,Y offsets specifying the position in the image from the camera where the match is found. In step 405 the system controller checks if there is any data to be read from feature analyzer 104. If there is, it reads one portion containing disc address and X,Y offsets at a recognized template 406. In step 407 a check is made for an element of the list S having the same disc address and X,Y offsets as the last read values. If there is one, the last values are not used, and the control returns to step 405 to check if there is more data to be read from feature analyzer 104. If there is no such element in S, a new element is created, containing last read values of disc address and X,Y offsets, and added to S, step 408, and the control returns to step 405 to check for more data from feature analyzer 104.

Figure 4:
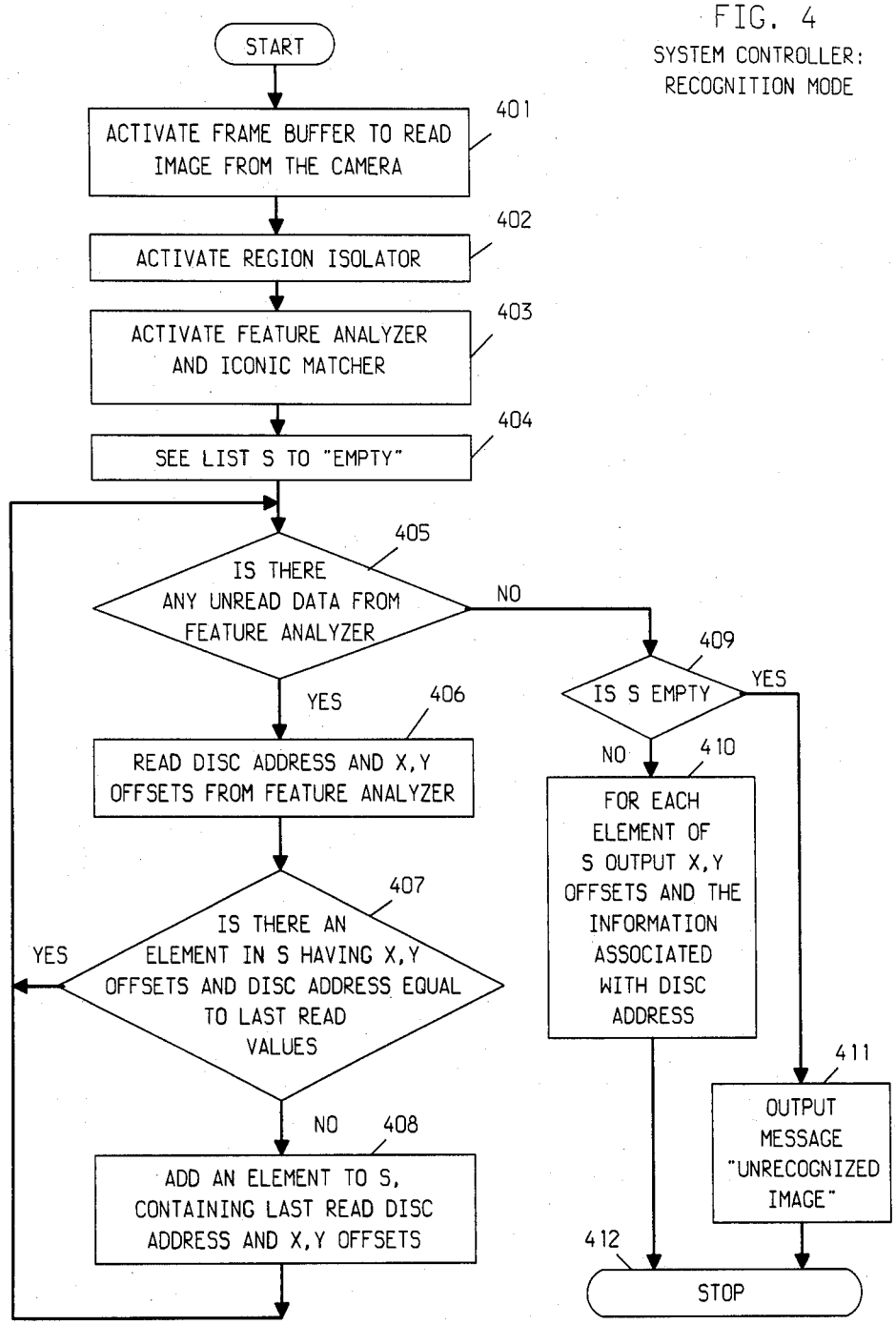
FIG. 4 shows a flow chart which describes the system controller recognition mode operating sequence.

When the test in step 405 shows that there is not more data from the feature analyzer 104, a check is made, 409, if the list S is empty, which signifies that feature analyzer 104 did not send any data at all. In this case a message "unrecognized image" is generated, step 411, if S is not empty. For each of its elements a message is generated, step 410, containing the X,Y offsets and the information associated with disc address, which may contain an object identification, or name, its distance from the position, orientation, view angle, disc address. The specific structure of this information will vary with applications. The process stops in step 412. All the messages generated by the system controller, FIG. 4, are sent either to user devices, or to the user portion of the software which may share the processor with this system.

Figure 5:
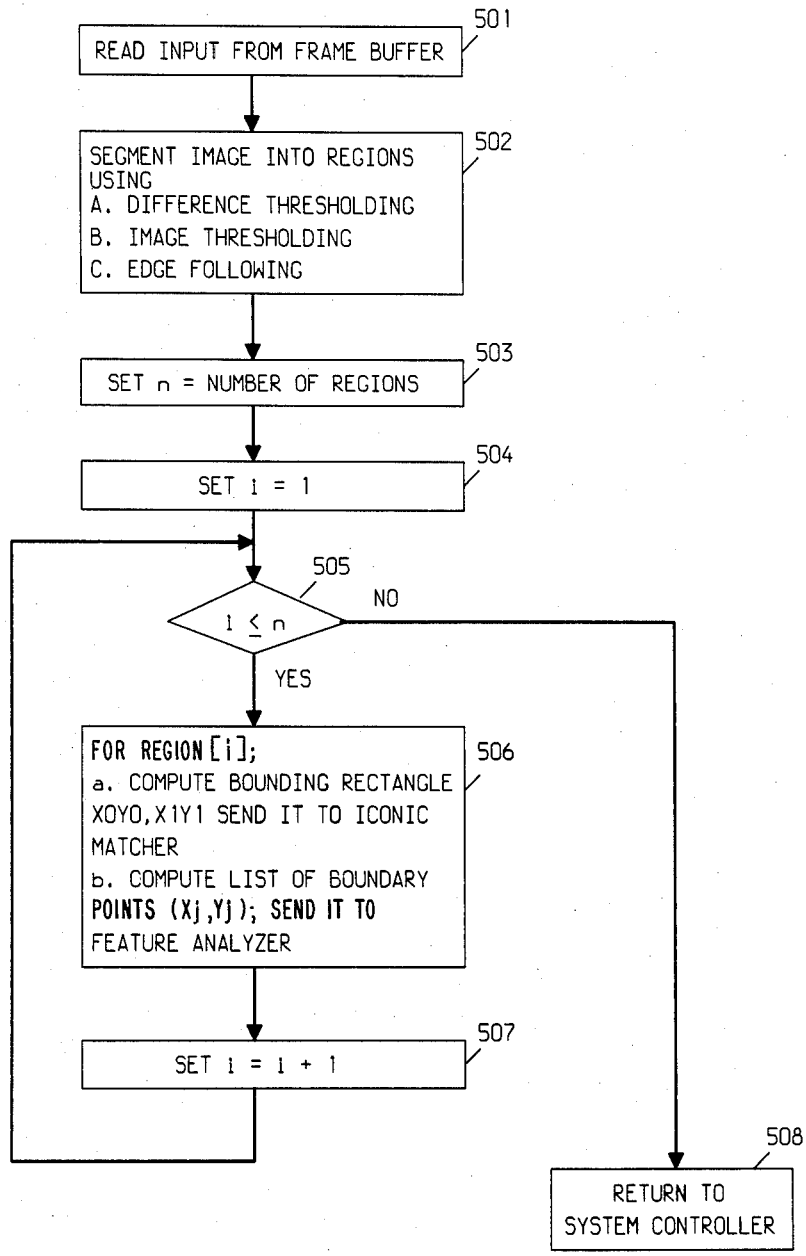
FIG. 5 shows a flow chart which describes the operation of the region isolator.

With reference to FIG. 5, the operation of the region isolator 103 is described. Region isolator process is invoked by either the training program, FIG. 3 at step 302, or by the recognition program, FIG. 4 at step 402. Region isolator 103 analyzes the images seen by camera 203 via frame buffer 102, step 501, and segments this image, step 502. Region isolator may segment using one of a variety of techniques including difference thresholding, image thresholding or edge following, depending on application requirements. These well known techniques are described in the book written by D. H. Ballard and C. M. Brown, entitled "Computer Vision", Prentice-Hall, Englewood Cliffs, 1982.

Basically, in difference thresholding the image in the frame buffer is subtracted from a previously stored background image. All the connected regions where the absolute difference exceeds a threshold are extracted.

In image thresholding the connected areas where the image intensity is greater (or smaller) than a threshold are extracted as regions. The threshold can be preset; computed from the intensity histogram or updated adaptively based on local intensities.

The steps below describe one edge following algorithm which may be used with the present invention.

1. Scan the image with a local edge operator until first sufficiently strong edge value is found.

2. Search the neighborhood of the current edge pixel for the next edge pixel, whose gradient, position and intensity are the closest to the prediction from the current and previous edge pixels.

3. Make the new edge pixel the current pixel and go to 2.

The above tracing procedure terminates when the edge pixels completely enclose an area, or if the accumulated edge strength falls below a given value. If the extracted boundary completely encloses a region, this region is extracted, otherwise, a rectangular region surrounding the discovered portion of the boundary is extracted.

In steps 504, 505, 506 and 507, the bounding rectangle and list of boundary points are determined for each region. In step 506 bounding rectangle information is sent to iconic matcher 105 and the list of boundary points are sent to feature analyzer 104. In step 508 system controller 204 returns control to the program that called region isolator 103, that is to either training program, FIG. 3 at step 303, or to recognition program, FIG. 4 at step 403.

With reference to FIG. 6, the operation of the feature analyzer 104 is described. As noted, the feature analyzer is invoked by either the training program, FIG. 3 at step 303, or by the recognition program, FIG. 4 at step 403.

Feature analyzer 104 is an object recognition system in itself, fast but not very accurate. It is utilized in the present invention to reduce the search time by quickly identifying disc frames which coarsely resemble the object to be recognized. Feature analyzer 104 selects disc frames which are likely to match the isolated region by comparing the features calculated from the region of those of the images stored on video disc. Features are properties of regions which are simple to compute but they usually do not represent complete information about the object. In step 601 the feature analyzer determines if a build classifier message (step 305 of FIG. 3) was received during the training mode. If so a hierarchical classification tree may be constructed, step 602, as described in the article by E. M. Rounds, "A Combined Nonparametric Approach to Feature Selection and Binary Decision Tree Design", Proc, of PRIP, Chicago, August 1979, pp. 38-43 and the article by D. E. Gustafson and S. Gelfand, "A Nonparametric Multiclass Partitioning Method for Classification", Proc. of 5th Internat. Conf. on Pattern Recognition, Miami Beach, December 1980, pp. 654-659 which articles are included by reference herein. At the conclusion of the classifier tree construction, control is returned to the system controller in step 603. If no classifier message was received the boundary points are read from region isolator 103.

If no data was available from the region isolator, the test at step 605 directs the control to step 603 which returns it to the system controller. In step 606 global and local features are determined. Global features include horizontal size, vertical size, area and variance of intensity within the region. Local features include maxima and minima of estimated boundary curvature, their values, orientations and positions. The local curvature may be estimated by the angle formed between two chords drawn on the boundary curves. Each global or local feature is represented by its type and a scalar or vector value.

If the system is in the training program, step 608, then in step 607 these features are stored in an attribute memory (801) of the feature analyzer 104 along with the disc address of the frame received from the system controller, step 303. This attribute memory 801 contains a list of all templates stored on video disc 101. The description of each template consists of its frame address, and a list of features. The features on the list are ordered according to type and (for local features) their values. The information from the attribute memory is used to construct a hierarchical classification tree, step 602, when the system controller sends the message, "build classifier", after all the frames have been processed, step 305.

In the recognition mode, for each segmented region the features of each extracted region are compared with the features of all templates of memory 801. The number of feature matches for each template is computed and n templates with highest number of feature matches are selected in step 609 for further matching. When the number of templates is larger than several thousands, the previously referenced hierarchical classification technique may be used to improve the speed. The selected templates are matched with the region, one at a time, by the iconic matcher, steps 610, 611, 612, 614, 615 and 616.

In step 611, the x and y offsets between the region and each selected template needed to align them are computed by taking the median value of offsets generated by matching pairs of local features.

The addresses of templates selected by the feature analyzer are sent, step 611, to the disc controller 201 so they can be retrieved from video disc 101 and sent to iconic matcher 105. Templates are ordered according to the number of matching features. At the same time the x and y offsets for each selected template are sent to iconic matcher, for the alignment of positions.

Figure 7:
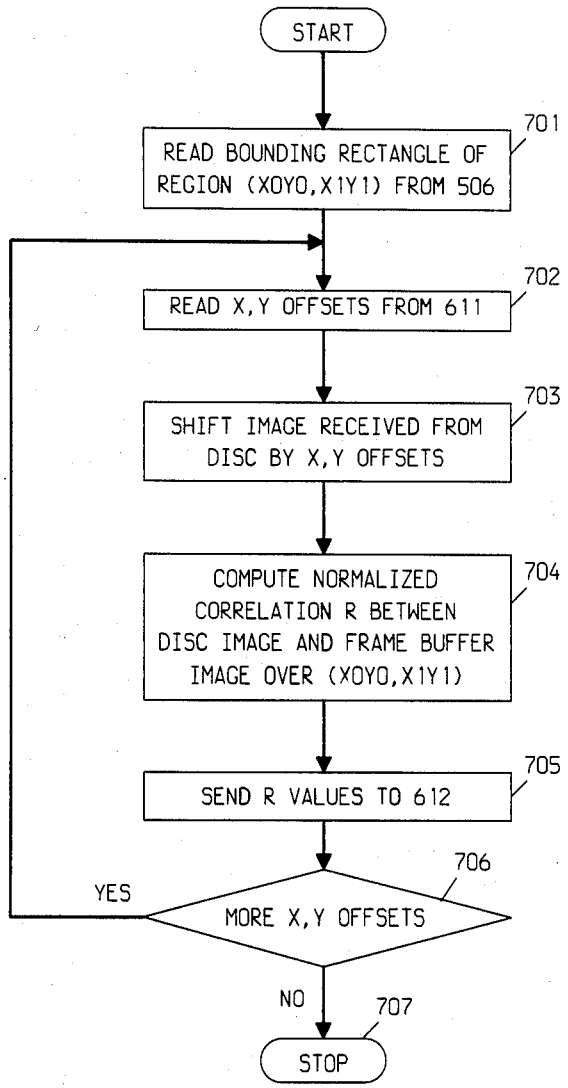
FIG. 7 shows a flow chart which describes the operation of the iconic matcher.

With reference to FIGS. 7 and 9, the operation of iconic matcher 105 is discussed. The iconic matcher 105 provides accurate identification for undistorted and untransformed images. Consequently, the system should be able to positively identify an object as long as a template or frame corresponding to its particular view is stored on the video disc.

In step 701, the bounding rectangle which defines the segmented region is read from region isolator 103 (from step 506 of FIG. 5). In step 702, the x and y offsets are obtained from feature analyzer 104 (from step 611 of FIG. 6). In step 703, each template received from the video disc is aligned with the isolated segment or region according to the x and y offsets received from the feature analyzer in step 102. In step 704, the value of R(IJ) is computed over the bounding rectangle of the template. The iconic matcher computes the normalized correlation between the isolated segmented region and templates retrieved from video disc 101. Normalized correlation between two images I(x,y) and J(x,y) is shown by 901 of FIG. 9. To compute R(IJ) the equivalent expression 902 of FIG. 9 may be easier implemented in hardware.

The normalized correlation R(IJ) represents the degree to which a template corresponds to a segmented or isolated region of the image, the larger is its value, the better is the correspondence. The value R(IJ) range is between −1 and 1, and it is not affected by linear changed (offset and gain) of intensity in either of the images.

In step 705, the normalized correlation R is returned to the feature analyzer. In step 706, if additional offsets are received from the feature analyzer, step 702 is repeated; if not, the functiqn of the iconic matcher is completed in step 707.

The iconic matcher operates interactively with the feature analyzer (FIG. 6). Specifically, the steps 702–705 are executed between the steps 611 and 612 of the feature analyzer. In step 612, the feature analyzer reads the match value R sent by iconic matcher, step 705. In step 614, the value of R received from the iconic matcher is compared against a threshold. Note, the first template which R exceeds the fixed threshold may be taken as the recognized object and further matching may be aborted. The frame address and positional information will be retrieved and returned in step 613 to the system controller for outputting as the system's response. However, in some applications, it may be better to match all the chosen templates from the video disc and choose the template that shows the most correlation as the recognized object. After the step 613, the feature analyzer returns to step 604 to read the next set of boundary points, if any, defining the next region or segment of the image.

If the value of R does not exceed the threshold, the next template i+1 is selected, steps 615,616, if all n closest templates have not been checked. If all of the n templates have been checked, step 616, the next set of boundary points from the region isolator is read, step 604, and the process repeats. After all the available sets of boundary points have been processed, step 605, the control is returned in step 603 to the system controller.

Note, the above process finds templates which correspond totally to the segmented region but, it will be unable to detect a match when a part of the object image is missing (occlusion) or distorted. Below twe describe an occluded image matching algorithm which can be used to find a correspondence (match) between a template (reference image) and partially occluded or distorted image of the same object.

1. Divide both images into k×k blocks and form a n/k by n/k binary array S initially filled with zeros. A pixel S(i,j) will correspond to the block whose top left pixel is (i by j, j by k).

2. Compute the normalized correlation within each block and if it exceeds a threshold place "1" in the corresponding pixel of the array S.

3. Find in S all connected region of "1" valued pixels.

4. For each connected region compute the value $$V=\Sigma I^2(x,y)-1/n\ (\Sigma I(x,y))^2$$

over the area of the template covered by blocks corresponding to the pixels of the connected region.

5. If V exceeds a threshold for any of the connected regions of S it signifies a partial match. The value V represents the total variability within a region. It is examined to avoid false matches from large uniform areas which may give large correlation.

Note, if desired, the above algorithm will be implemented in an extended version of the matcher.

It is anticipated that other well known apparatus or circuits can be utilized to implement some or all of the circuitry features and functions of the present invention. Thus, what has been disclosed is merely illustrative of the present invention. Other arrangements and methods can be implemented by those skilled in the art without departing from the spirit and scope of the present invention.

What is claimed is:

1. A method of operating an image recognition system comprising the steps of:
   segmenting a video image into two or more regions based on variations in intensity in said video image;
   screening the characteristics of each of said regions by comparing curvature and orientation attributes of selected local features of regions with reference features stored in an attribute memory and identifying one or more sets of reference features from said attribute memory which closely resemble a set of selected local features of each region;
   retrieving one or more reference images for each regions from an image memory using addresses from the screening and identifying step;
   for each of the reference images, computing a horizontal and a vertical offset by matching each of said selected local features with each of said reference features; and
   using the offsets computed in the previous step, aligning and matching the intensity of each of said regions against the intensity of each of the retrieved reference images for that region to determine one reference image which most closely matches that region.

2. The method of claim 1 wherein said segmenting step includes an edge following algorithm to identify the regions.

3. The method of claim 1 wherein said segmenting step includes a difference thresholding algorithm to identify the regions.

4. The method of claim 1 wherein said segmenting step includes an image thresholding algorithm to identify the regions.

5. The method of claim 1 wherein said screening and identifying step uses a hierarchical classification method for identifying sets of reference features.

6. The method of claim 1 wherein said aligning and matching step uses a two dimensional normalized correlation to determine the degree of match between the reference image and the region.

7. The method of claim 1 wherein said aligning and matching step uses an occluded image matching algorithm to determine the degree of match between a reference image and an occluded object in that region.

8. The method of claim 1 wherein the image memory has fast sequential access.

9. The method of claim 8 wherein the image memory has slow random access.

10. The method of claim 9 wherien the image memory is a video disc.

11. An image recognition system comprising
   means for segmenting a video image into two or more regions based on variations in intensity in said video image;
   means for screening the characteristics of each of said regions by comparing curvature and orientation attributes of selected local features of regions with reference features stored in an attribute memory and identifying one or more sets of reference features from said attribute memory which closely resemble a set of selected local features of each region;

means for retrieving one or more reference images for each region from an image memory using addresses from the screening and identifying step;

means for computing for each of the reference images a horizontal and a vertical offset by matching each of said selected local features with each of said reference features; and means for aligning using the offsets computed by said computing means and for matching the intensity of each of said regions against the intensity of each of the retrieved reference images for that region to determine one reference image which most closely matches that region.

* * * * *